United States Patent [19]

Hall et al.

[11] Patent Number: 5,393,192
[45] Date of Patent: Feb. 28, 1995

[54] UNDERFLOOR EXTENDIBLE RAMP FOR VEHICLES

[75] Inventors: John C. Hall, Hayward, Calif.; Paul F. Risner, Carey, Ohio

[73] Assignee: REB Manufacturing Co., Inc., Carey, Ohio

[21] Appl. No.: 136,655

[22] Filed: Oct. 1, 1993

[51] Int. Cl.$^6$ ............................................. B60P 1/00
[52] U.S. Cl. ................................... 414/537; 296/26; 296/61; 414/921; 14/69.5
[58] Field of Search ............... 414/537, 538, 522, 921, 414/477, 480; 296/26, 61; 14/71.1, 69.5

[56] References Cited

U.S. PATENT DOCUMENTS

| | | | |
|---|---|---|---|
| 1,639,879 | 8/1927 | Buffington | 296/61 |
| 1,699,882 | 1/1929 | Ferguson | 296/61 X |
| 3,511,393 | 5/1970 | Abromavage et al. | 414/537 |
| 3,870,170 | 3/1975 | Noble et al. | 14/69.5 X |
| 3,933,258 | 1/1976 | Forsyth et al. | 414/537 |
| 3,955,827 | 5/1976 | Wonigar | 280/166 |
| 4,058,228 | 11/1977 | Hall | 414/549 |
| 4,078,678 | 3/1978 | Tordella | 414/537 |
| 4,134,504 | 1/1979 | Salas et al. | 414/921 X |
| 4,198,187 | 4/1980 | Mountz | 414/537 |
| 4,242,032 | 12/1980 | Whiteman et al. | 414/537 |
| 4,305,694 | 12/1981 | Chan | 414/537 X |
| 4,325,668 | 4/1982 | Julian et al. | 414/546 |
| 4,372,727 | 2/1983 | Fredrickson et al. | 414/537 |
| 4,685,857 | 8/1987 | Goeser et al. | 414/522 |
| 4,685,858 | 8/1987 | Manning et al. | 414/537 |
| 4,722,109 | 2/1988 | Mountz | 14/71.1 |
| 4,759,682 | 7/1988 | Hood | 414/537 |
| 4,850,788 | 7/1989 | Dickson | 414/537 |
| 4,900,217 | 2/1990 | Nelson | 414/537 |
| 4,958,979 | 9/1990 | Svensson | 414/549 |
| 5,133,634 | 7/1992 | Gingrich et al. | 414/537 |
| 5,158,419 | 10/1992 | Kempf et al. | 414/539 |
| 5,160,236 | 11/1992 | Redding et al. | 414/537 |
| 5,199,150 | 4/1993 | Mortenson | 414/537 X |
| 5,257,894 | 11/1993 | Grant | 414/537 |
| 5,305,486 | 4/1994 | Smith et al. | 414/522 X |

*Primary Examiner*—David A. Bucci
*Attorney, Agent, or Firm*—Hugh Adam Kirk

[57] ABSTRACT

The disclosure comprises a tray mountable under the floor of a vehicle, which tray contains an extendible ramp mechanism. This mechanism comprises a ramp and a driving panel for the ramp. The ramp is fulcrummed intermediate its ends on the outer ends of parallel arms extending from the driving panel. Also in the tray, as part of the driving mechanism, are a pair of parallel toothed belts driven by a reversible rotating motor, which belts are attached to the driving panel for extending and retracting the ramp from the tray. Mounted under the driving panel is a reciprocating motor connected by a crank arm to a shaft having additional crank arms pivotally connected to the underside of the ramp adjacent the driving panel. When the ramp is fully extended, the reciprocating motor tilts the ramp so that its inner end is moved upwardly to be flush with the floor of the vehicle. Simultaneously, the outer end of the ramp contacts the ground. The ramp has parallel side barriers which spring into position when the ramp is fully extended. These barriers are automatically folded against the top surface of the ramp by an angularly-mounted roller which contacts a cammed surface at the inner ends of each barrier as the ramp is retracted into the tray.

14 Claims, 8 Drawing Sheets

UNDERFLOOR EXTENDIBLE RAMP FOR VEHICLES

BACKGROUND OF THE INVENTION

Many underfloor extendible ramps are known, including those driven by motors and including those ramps fulcrummed intermediate their ends so that the inner ends of the ramps can be tilted up to be flush with the floor above them. Ramps also are known to have motor means for tilting these ramps. However, no reference was found combining all of these features, nor in the specific way and by the specific means invented by applicants. Furthermore, no such ramps were found with parallel side barriers which automatically folded when the ramp was retracted.

SUMMARY OF THE INVENTION

Generally speaking, the invention comprises a rectangular tray mounted under the floor of a vehicle, which tray contains a ramp and a motor-driven mechanism for extending and retracting the ramp. The ramp provides easy access of wheeled vehicles, including wheelchairs, to and from a low floor of a vehicle. This ramp is fulcrummed intermediate its ends so that the inner end may be tilted upwardly flush with the floor of the vehicle when the ramp has been fully extended. An additional motor means is provided for tilting the ramp.

More specifically, the mechanism in the tray for extending and retracting the ramp comprises a driving panel at the inner end of the ramp. This driving panel has two parallel arms extending outwardly under the ramp. At the end of each arm is a fulcrum or pivot intermediate the ends of the ramp for tilting of the ramp when the ramp is fully extended. Near the inside corners of the tray are toothed pulleys for guiding a pair of toothed belts parallel to each other and to the direction of motion of the ramp. Adjacent ends of each belt are clamped together and to the underside of the driving panel. The two pulleys at the inner end of each belt are keyed to a common shaft driven by a reversible rotating motor for moving the driving panel and ramp inwardly and outwardly of the tray. The parallel opposite edges of the ramp and its driving panel are guided in parallel channels or rails along each side of the tray. Limit switches are provided for stopping and reversing the rotation of the motor when the ramp reaches its fully-extended and fully-retracted positions.

A separate reciprocating motor mounted under the driving panel is connected to a crank arm on the shaft mounted under the outer edge of the driving panel. This shaft also has keyed thereto two parallel crank arms pivoted to spaced brackets under the inner end of the ramp. Once the ramp has been fully extended from the tray and vehicle, the reciprocating motor is operated to tilt the inner end of the ramp upwardly around its fulcrum to cause the upper edge of the ramp to be flush with the floor of the vehicle. Reversal of this reciprocating motor pivots the ramp up into its horizontal position aligned with the tray and its side rails. Then the belt-driving mechanism is reversed to retract the ramp back into the tray under the floor of the vehicle.

An additional feature comprises barriers or guiding flanges along opposite sides of the ramp which are automatically raised by torsion springs on the hinges for the barriers. These springs raise the barriers as soon as the whole ramp extends outwardly from its guiding rails and beyond the end of the tray. The inner end of the barriers are provided with angular cam surfaces which engage angularly-mounted rollers on opposite outer corners of the tray. These rollers when contacting these cam surfaces fold the barriers against the action of their springs onto the surface of the ramp as the ramp is retracted into the tray.

OBJECTS AND ADVANTAGES

Accordingly, it is an object of this invention to produce a simple, efficient, safe, economic, effective, and compact motor-driven extendible and retractable ramp for vehicles.

Another object is to produce such a ramp having automatic parallel side barriers.

A further object is to provide an extendible and retractable ramp mounted under a low-floored vehicle for easy access of wheelchairs for the handicapped person and/or other wheeled articles.

Still another object is to provide such a ramp means in which the extendible and retractable ramp is driven by one motor and the tilt of the ramp is driven by a separate motor.

BRIEF DESCRIPTION OF THE VIEWS

The above mentioned features, objects and advantages, and a manner of attaining them are described more specifically below by reference to an embodiment of the invention shown in the accompanying drawings wherein.

DETAILED DESCRIPTION OF PREFERRED EMBODIMENTS

Figure 1:
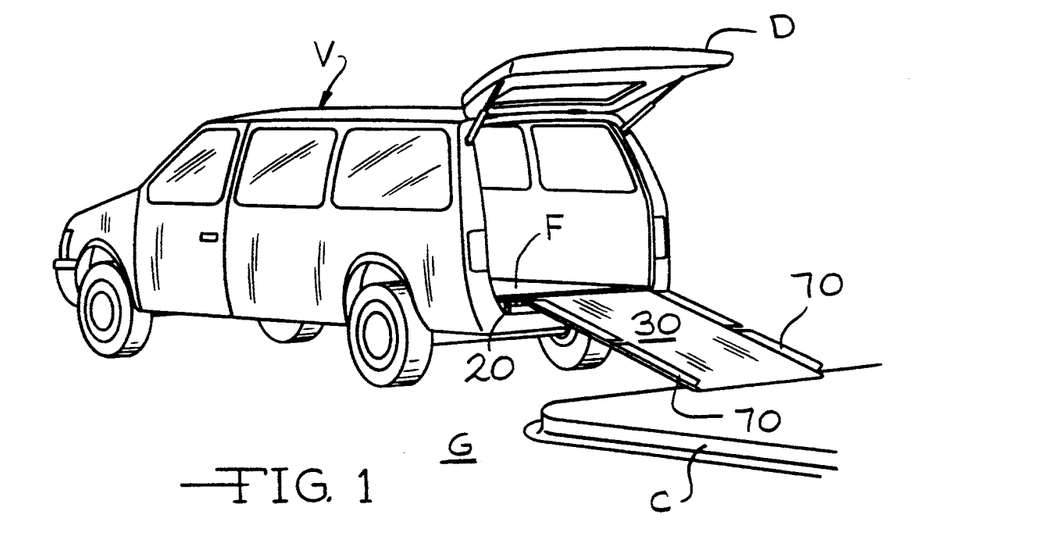
FIG. 1 is a perspective view of a vehicle having an underfloor ramp according to a preferred embodiment of this invention, with the ramp shown in its fully extended and tilted position for use.
Figure 2:
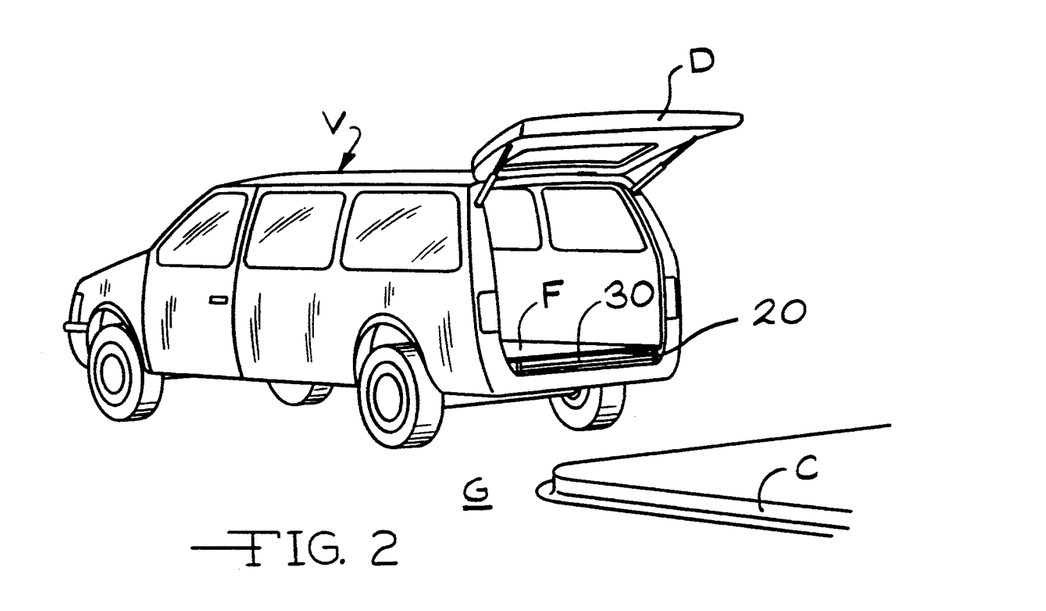
FIG. 2 is a view of the vehicle shown in FIG. 1, but with the ramp completely retracted.

Referring first to FIGS. 1 and 2 there is shown a perspective view of a vehicle V having an open rear door D and a low floor F inside the vehicle. There is also shown a curb C on the ground G, upon which ground the vehicle is supported adjacent the curb. A preferred embodiment of the under floor extendible ramp assembly comprises a tray member 20 under the floor F. The underfloor ramp 30 is shown in FIG. 1 extending from the outer end of the tray 20 and tilted so that its outer end rests on the curb C and the upper end is tilted to be flush with the floor F of the vehicle V. In FIG. 2 the ramp is shown retracted into the tray 20 under the floor F.

The Ramp Mechanism

Figure 3:
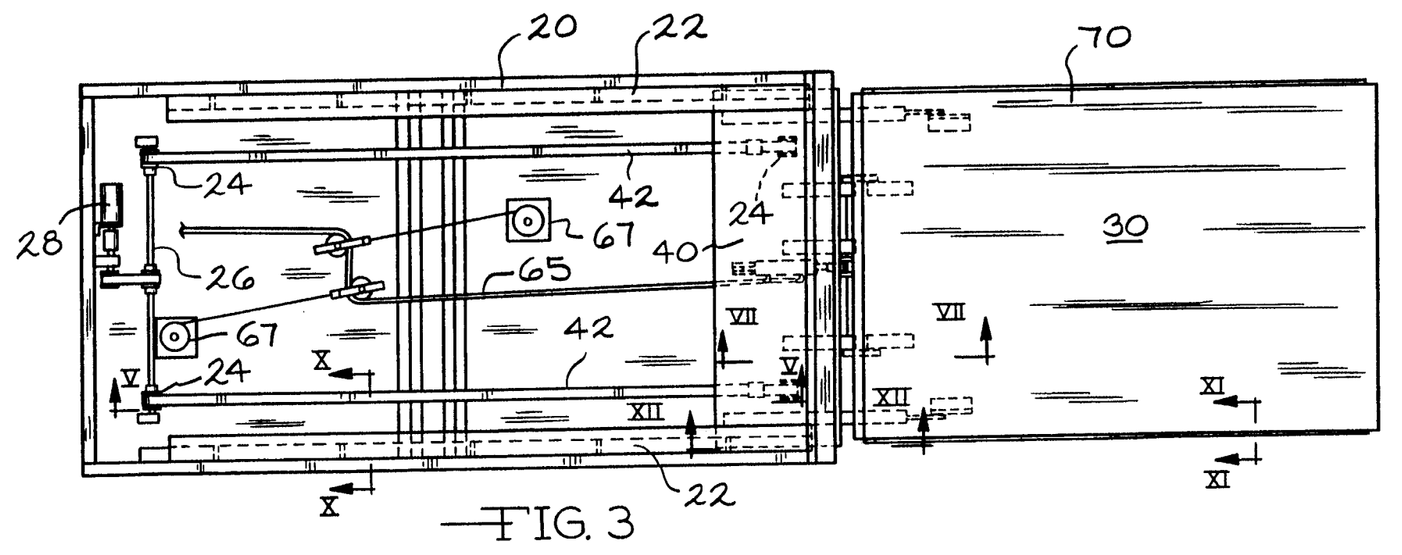
FIG. 3 is a top plan view of the tray in which the extendible ramp of the invention is mounted showing the ramp and its driving panel in their fully extended positions and the reversible motor for driving the belts for the driving panel that extends and retracts the ramp.
Figure 4:
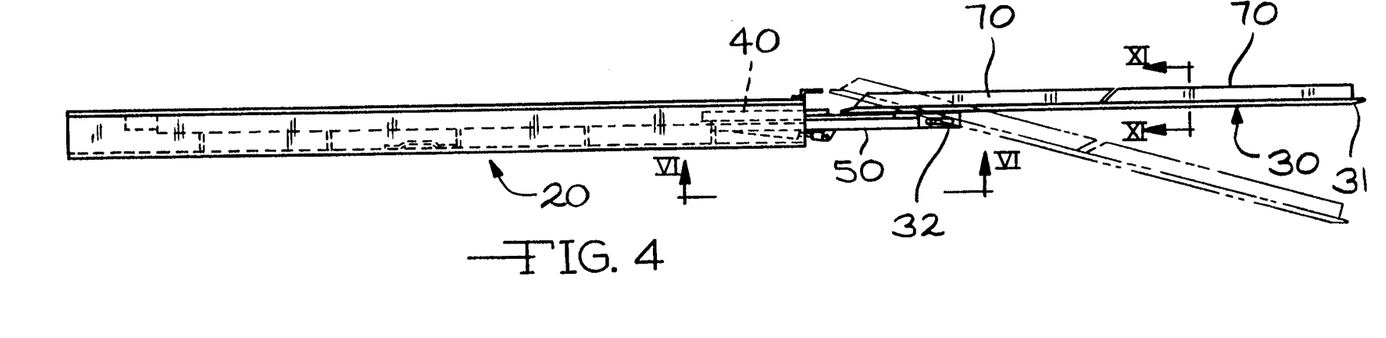
FIG. 4 is a side elevational view of FIG. 3 showing in dotted lines the ramp in its tilted position.
Figure 5:
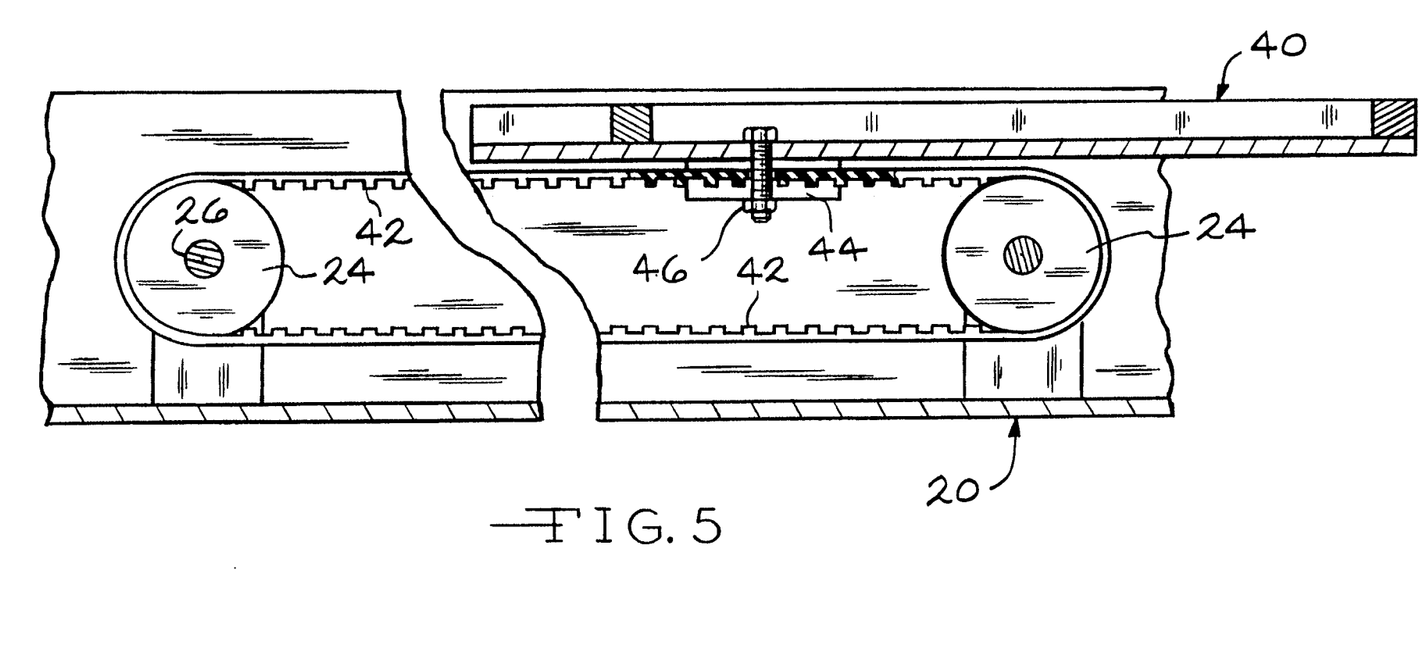
FIG. 5 is an enlarged sectional view taken along line V—V of FIG. 3 with parts broken away and showing one of the two belts and its connection to the driving panel that moves the ramp.
Figure 10:
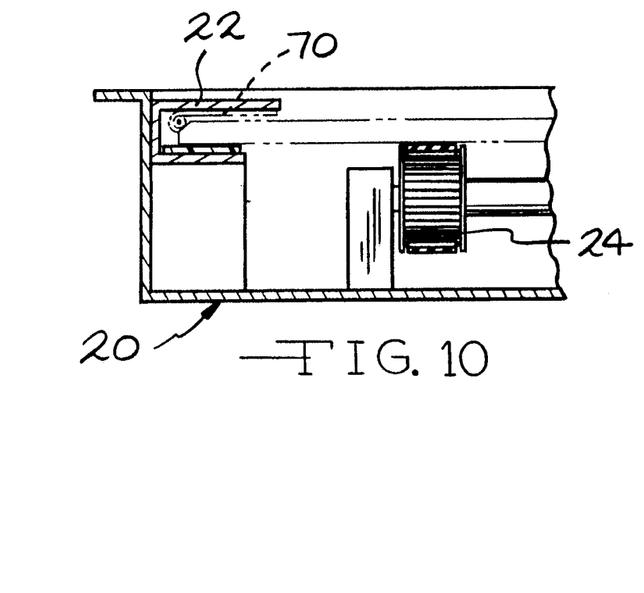
FIG. 10 is an enlarged sectional view taken along lines X—X of FIG. 3 showing a part of the tray and one of the guide rails for the edge of the ramp (shown in dotted lines) and one of the two pulleys and its belt on the driven shaft for moving the driving panel.
Figure 11:
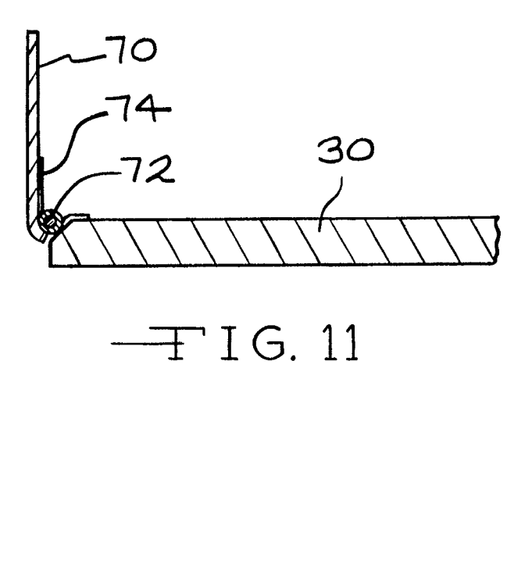
FIG. 11 is an enlarged sectional view taken along line XI—XI of FIGS. 3 and 4 showing part of the ramp and one of its side barriers with its resilient mounting hinge.
Figure 12:
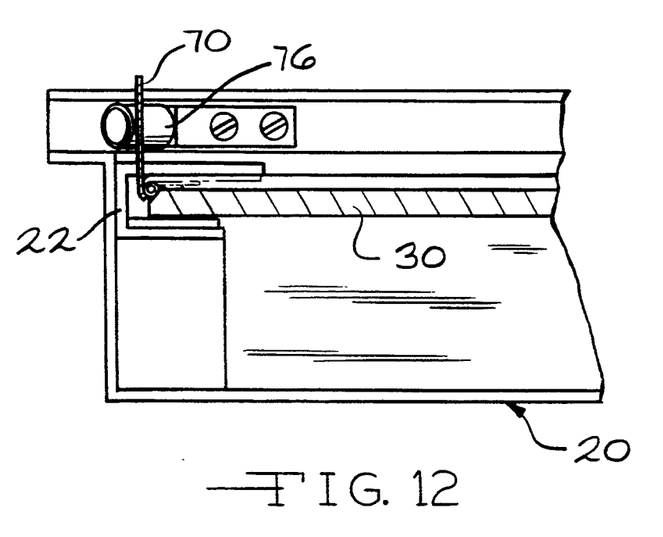
FIG. 12 is an enlarged sectional view similar to FIGS. 10 and 11 showing part of the tray, ramp and barrier, and the roller at the outer end of the tray for automatically folding the barrier when the tray is retracted and the end of the barrier contacts the roller to be folded into its dotted-line position.
Figure 13:
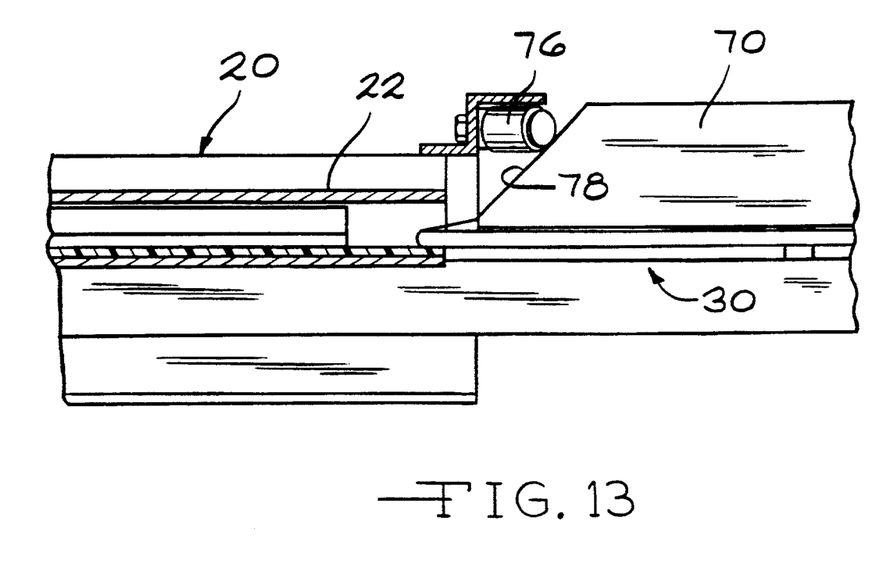
FIG. 13 is a side elevational view of FIG. 12 with parts broken away, showing the cam surface at the inner end of the barrier just contacting the roller which will fold the barrier down against the up surface of the ramp so the ramp and barrier can slide in the rail along the side of the tray.
Figure 14:
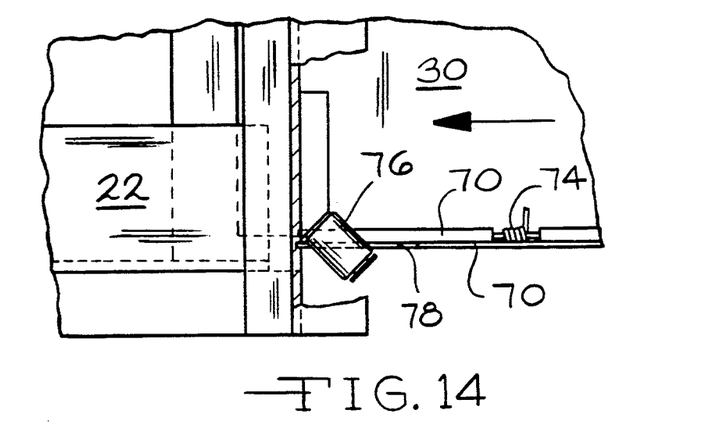
FIG. 14 is a plan view of FIG. 13 with parts of the tray and ramp broken away, but showing the roller and end of the barrier just contacting each other.
Figure 15:
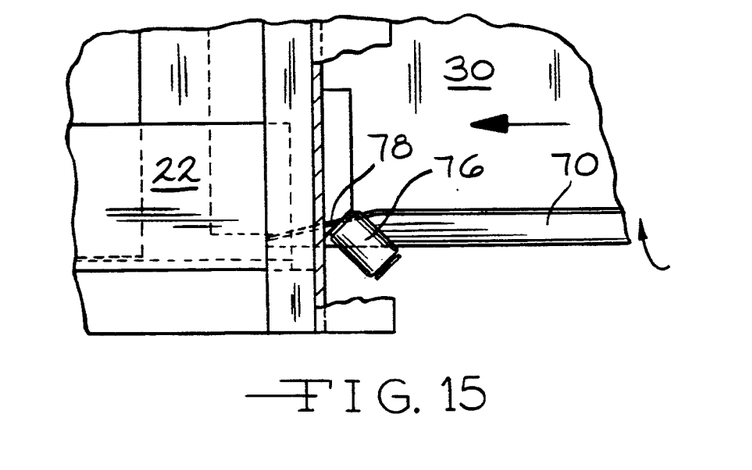
FIG. 15 is a view similar to FIG. 14 but with the barrier partially folded.
Figure 16:
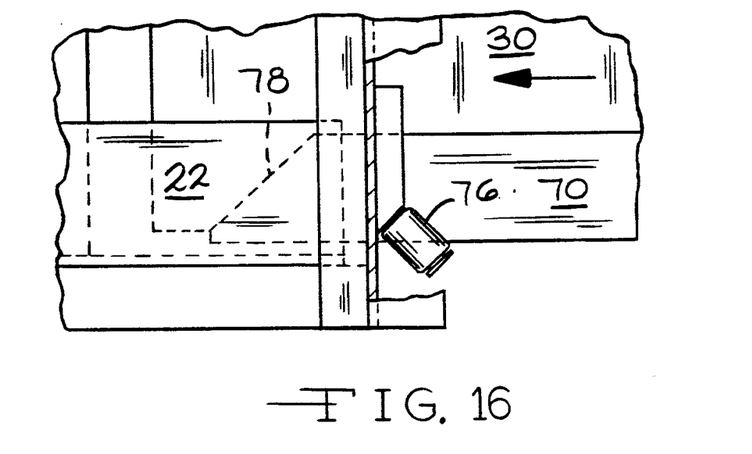
FIG. 16 is a view similar to FIGS. 14 and 15 with the barrier in its folded position and moved partially into the rail for guiding the ramp.

Referring now to FIGS. 3 and 4 there is shown the tray 20 having parallel guide rails 22 along opposite sides thereof for guiding the parallel side edges of the ramp 30 and its driving panel 40. This driving panel 40 reciprocates between the two ends of the tray 20 by means of a pair of parallel toothed belts 42 (see also FIGS. 5 and 10). The opposite ends of each belt 42 are clamped together and to the bottom of the carrier 40 by a congruently grooved clamp 44 and bolt 46. These belts 42 extend around toothed pulleys 24 mounted on the bottom of the inside corners of the tray 20. The two pulleys at the rear or inner end of the tray 20 are keyed to a drive shaft 26, which shaft is driven by a reversible rotating motor 28. This motor 28 is manually controlled and may be electric or hydraulic and may be connected axially with the shaft 26 or by a belt or gears. Limit switches (not shown) are provided at opposite ends of the tray 20 for locating the ends of travel of the driving panel 40 and its connected ramp 30.

The Tilting Mechanism

Figure 6:
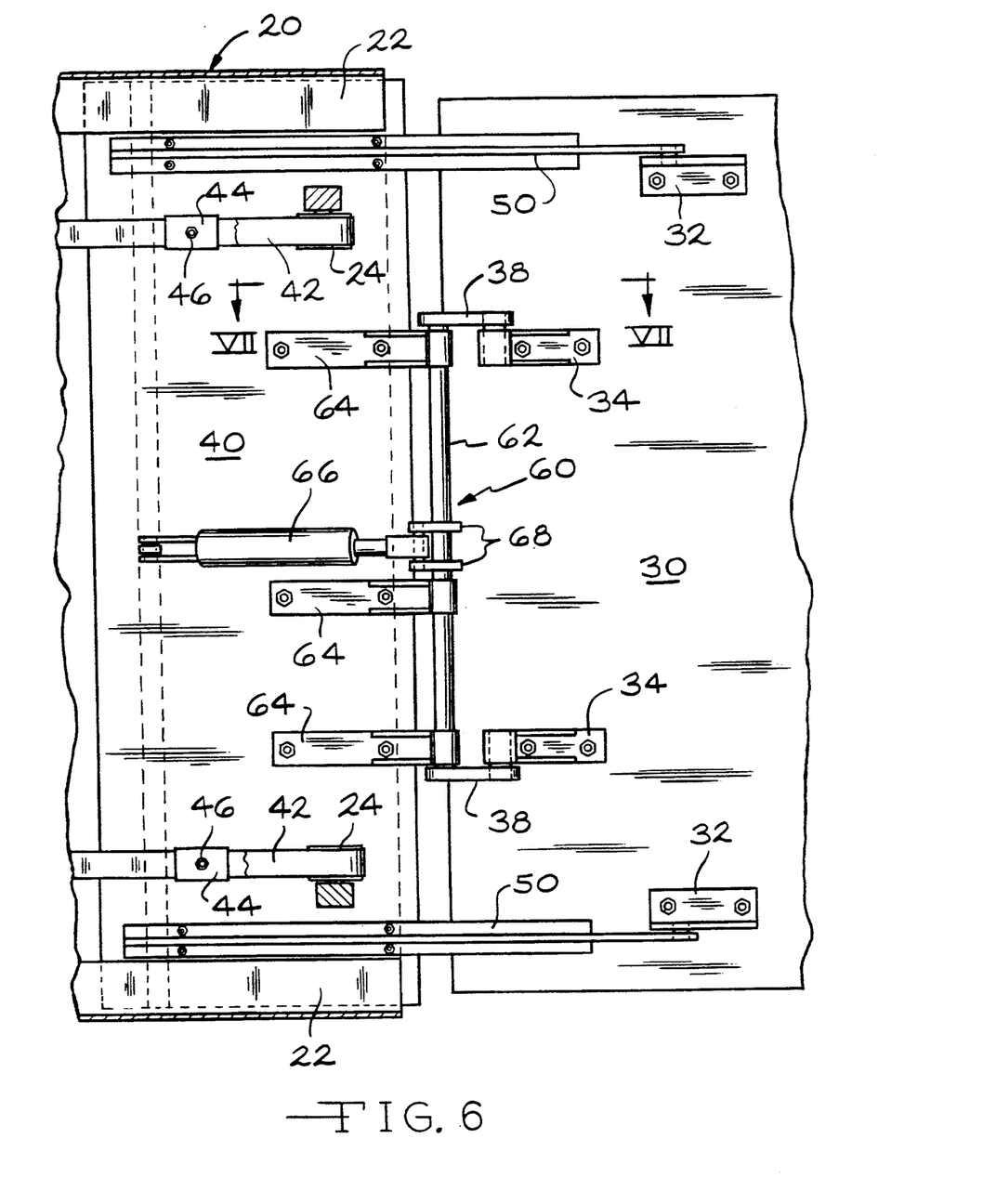
FIG. 6 is an enlarged bottom view taken along lines VI—VI of FIG. 4 of the driving panel and the adjacent end of the ramp with parts broken away, showing the fulcrum for the ramp and the crank mechanism for tilting the ramp when extended.
Figure 7:
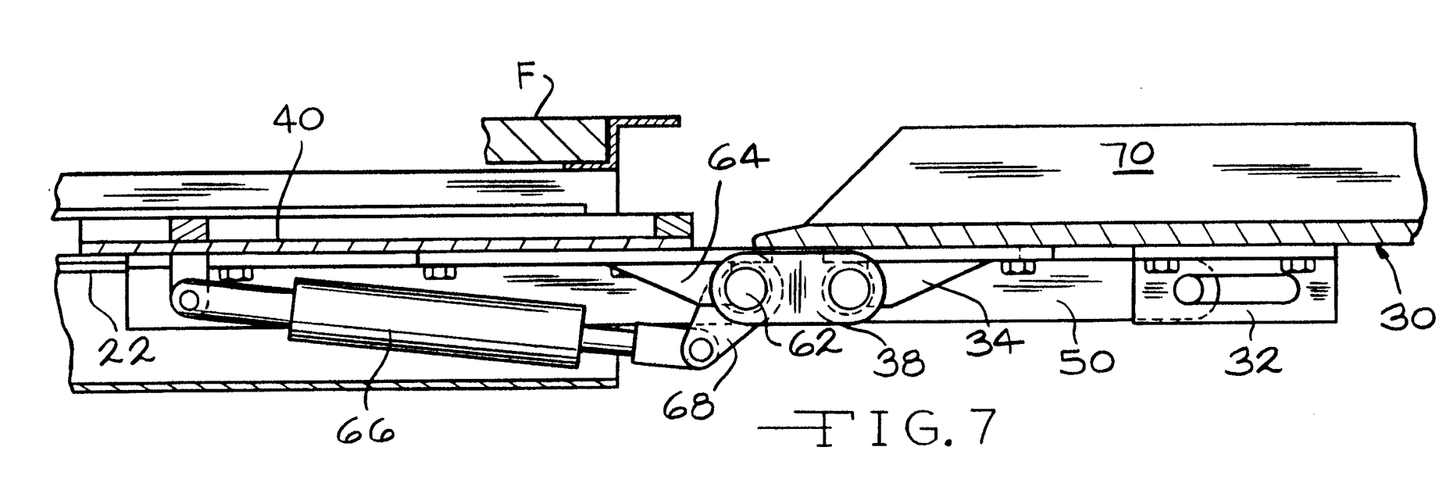
FIG. 7 is an enlarged sectional view taken along line VII—VII of FIG. 6, with parts of the driving panel and ramp broken away, showing the reciprocating motor mechanism for operating the crank mechanism for tilting the upper end of the ramp showing the ramp in its untilted position.

Referring now to FIGS. 6 through 9, FIG. 6 is an enlarged view of the underside of the driving panel 40 and adjacent end of the ramp 30 showing the connections between these two members. The pivotal connection of the ramp 30 to the driving panel 40 is at the outer ends of the arms 50 which pivot in slotted brackets 32 mounted underneath the ramp 30. These slots permit the fulcrummed ramp 30 to be tilted upwardly and sloped at different angles, depending upon whether or not the outer end of the ramp 30 is flush with the ground G or on the top of a curb C as shown in FIG. 1. The outer lower end of the ramp 30 may be bevelled at 31 (see FIG. 4) to reduce the bump between the upper surface of the ramp and the ground G. These arms 50 may have a flange or an inverted T-shaped cross-section at the underside of the driving panel 40 for bolting to the panel 40 as shown in FIG. 6. This pivotal mounting 32 for the ramp 30 located inwardly of the inner end of the ramp 30 also permits the tilting of the ramp once it is fully extended, so that the inner end of the ramp 30 may be tilted upwardly to be flush with the floor F of the vehicle V as shown in dotted lines in FIG. 4 and in full lines in FIG. 9.

Figure 8:
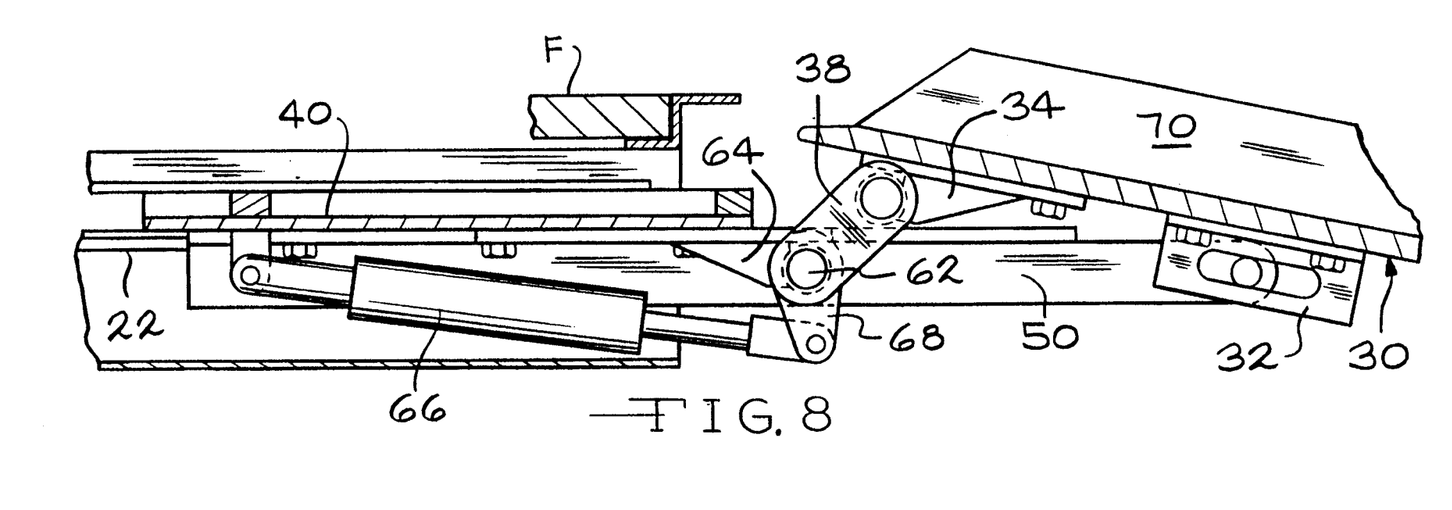
FIG. 8 is a view similar to FIG. 7 with the ramp in its half-tilted position.
Figure 9:
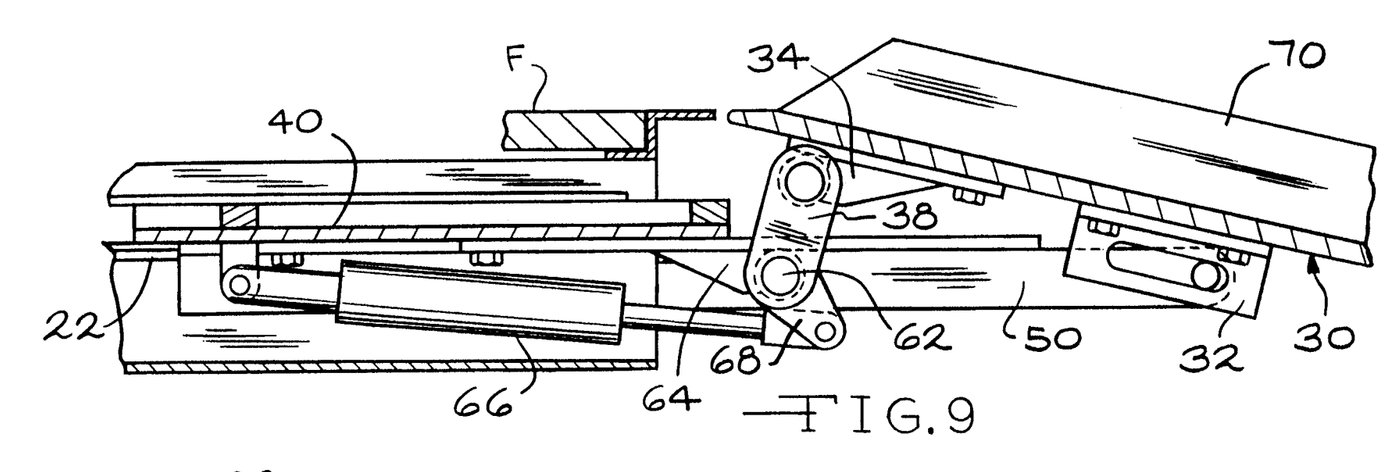
FIG. 9 is a view similar to FIGS. 7 and 8 with the ramp in its fully tilted position with its upper end flush with the floor of the vehicle.

Also mounted under the driving panel 40 is the tilting mechanism 60 which comprises a rocker shaft 62 mounted on brackets 64 bolted or attached to the underside outer edge of the driving panel 40. A reciprocating motor 66 is also mounted under the driving panel 40 and is connected to the rocker shaft 62 by means of crank arm 68. Adjacent the brackets 64 on the driving panel 40 there are also provided brackets 34 on the ramp 50, which brackets 34 journal the outer ends of crank arms 38 keyed to the shaft 62. Thus, when the ramp 30 is fully extended, the reciprocating motor 66 is operated to extend its piston to move crank 68 to raise correspondingly the inner end of the ramp as shown in FIGS. 8 and 9. In FIG. 3 there is shown a flexible power connection such as a cable 65 and slack-take-up devices 67 mounted in the tray 20 so that the flexible power connection to the reciprocating motor 66 will not become entangled and/or block the reciprocation of the driving panel 40.

The Barriers

Referring now more specifically to FIGS. 11 through 16, there is shown one of the parallel side barriers 70 which spring into position as soon as the ramp 30 has been completely extended from the tray 20. Each automatic barrier 70 is pivoted on a hinge axle 72 around which axle is provided at least one torsion spring 74 (see FIG. 11) to normally urge the barrier 70 into its vertical or operated position. Referring now to FIGS. 12 through 16, there is provided on each of the two outer corners of the tray 20, an angularly-mounted roller 76 which engages the bevelled or cammed end 78 of each barrier 70 so that as the ramp 30 is retracted into the tray 20, the bevelled edge 78 engages the roller as shown sequentially in FIGS. 13 through 16 to bend the barrier 70 inwardly and onto the top surface of the ramp 30 against the action of the spring 74. This flange or barrier 70 may be provided in more than one section throughout the length of each longitudinal side of the ramp 30. The separate and reciprocating motor 66 for tilting the ramp 30 may be electric or hydraulic. The motor 66 also is manually controlled, but only when the ramp 30 is in its fully extended position.

While there is described above the principles of this invention in connection with specific apparatus, it is to be clearly understood that this description is made only by way of example and not as a limitation to the scope of this invention.

We claim:

1. In a vehicle having an underfloor extendible ramp, a pair of parallel ramp supporting rails, and a reversible first motor means for moving said ramp, the improvement comprising:

A) a driving panel guided in said rails and having an extension pivotally connected to said ramp, B) parallel belts driven by said first motor means and connected to said driving panel for extending and retracting said ramp, and C) a reversible second motor means mounted on said driving panel and connected to said ramp for tilting said ramp when said ramp is fully extended.

2. A ramp according to claim 1 wherein said belts are toothed belts.

3. A ramp according to claim 1 wherein said reversible motor means are electrically controlled.

4. A ramp according to claim 1 including automatic barriers along opposite parallel sides of said ramp, which barriers move into vertical barrier position as soon as the ramp is completely extended from the vehicle.

5. In a vehicle having a floor and a ramp means extendible and retractable from under the floor of said vehicle, said ramp means comprising:

a) a fulcrummed ramp panel, b) a driving panel connected to said ramp panel, c) parallel side rails under said floor for guiding said panels, d) rotating motor means connected to said driving panel to extend and retract said panels between said parallel side rails, and e) a reciprocating motor means mounted under said driving panel and connected to said ramp panel to tilt said ramp panel when said ramp panel is fully extended into its ramp position.

6. A ramp means according to claim 5 wherein said motor means comprises a pair of parallel toothed belts fastened to said driving panel.

7. A ramp means according to claim 6 wherein said belts engage toothed pulleys on a shaft driven by said rotating motor means.

8. A ramp means according to claim 5 including a flexible power connection to said reciprocating motor means.

9. A ramp means according to claim 5 including parallel side barriers along said ramp panel.

10. A ramp means according to claim 9 including resilient means for urging said barriers into their upright barrier position.

11. A ramp means according to claim 9 wherein said barriers are hinged and automatically foldable onto said ramp panel when said ramp panel is retracted into said rails.

12. A ramp means according to claim 5 wherein said ramp panel has a ground bevelled end.

13. An underfloor retractable ramp for a low floor vehicle comprising:

a) a shallow box having a bottom, parallel side rails, an open top and an open outer end, b) a driving panel guided between said rails having outwardly extending parallel arms, c) a ramp pivotally attached to said arms and guided between said side rails for movement by said driving panel, d) reversible motor-driven belt means attached to said driving panel for reciprocating said driving panel between said side rails for extending and retracting said ramp, and e) reciprocating motor means under said driving panel for operating a rocker means for tilting said ramp when fully extended.

14. A ramp means according to claim 13 including means for automatically raising parallel side barriers on said ramp when said ramp is fully extended.

* * * * *